United States Patent
McGee et al.

(10) Patent No.: US 7,324,641 B2
(45) Date of Patent: Jan. 29, 2008

(54) ACTIVATING TELEPHONE-BASED SERVICES USING A POS DEVICE

(75) Inventors: Christopher R. McGee, Parker, CO (US); Steven E. Arthur, Parker, CO (US); Keith Newbrough, Parker, CO (US)

(73) Assignee: First Data Corporation, Englewood, CO (US)

( * ) Notice: Subject to any disclaimer, the term of this patent is extended or adjusted under 35 U.S.C. 154(b) by 556 days.

(21) Appl. No.: 10/675,924

(22) Filed: Sep. 29, 2003

(65) Prior Publication Data

US 2005/0180550 A1    Aug. 18, 2005

(51) Int. Cl.
*H04M 3/00* (2006.01)
*H04M 17/00* (2006.01)
*H04M 15/00* (2006.01)

(52) U.S. Cl. ............... 379/332; 379/144.04; 379/114.2

(58) Field of Classification Search ................ 379/332, 379/144.04, 114.17, 114.19, 114.2, 121.06
See application file for complete search history.

(56) References Cited

U.S. PATENT DOCUMENTS

| | | | |
|---|---|---|---|
| 5,179,585 A | 1/1993 | MacMillan, Jr. et al. | |
| 5,918,909 A * | 7/1999 | Fiala et al. | 283/61 |
| 6,547,132 B1 | 4/2003 | Templeton et al. | |
| 6,745,022 B2 * | 6/2004 | Knox | 455/406 |
| 6,829,596 B1 * | 12/2004 | Frazee | 705/66 |
| 2002/0088851 A1 * | 7/2002 | Hodes | |
| 2002/0091573 A1 * | 7/2002 | Hodes | |
| 2002/0153414 A1 * | 10/2002 | Stoutenburg et al. | |
| 2002/0169719 A1 * | 11/2002 | Dively et al. | |
| 2004/0139318 A1 * | 7/2004 | Fiala et al. | 713/165 |

* cited by examiner

*Primary Examiner*—William J. Deane, Jr.
(74) *Attorney, Agent, or Firm*—Townsend and Townsend and Crew LLP

(57) ABSTRACT

A method of providing telephone response unit (TRU)-based services includes receiving from a point-of-sale (POS) device a request at a host computer system to activate TRU-based services. The request includes an identifier that indicates the specific TRU-based services to be activated. The method also includes confirming the availability of the specific TRU-based services to be activated and storing at the host computer system information that indicates the services are activated. The method also includes returning a message to the POS that indicates that the TRU-based services have been activated.

13 Claims, 3 Drawing Sheets

ACTIVATING TELEPHONE-BASED SERVICES USING A POS DEVICE

BACKGROUND OF THE INVENTION

The present invention relates generally to telephone-based services. The present invention relates more particularly to activating pre-paid telephone-based services via a point-of-sale device.

Telephone-based services have become ubiquitous in present society. One merely need watch a few minutes of late night television before being confronted with an advertisement for some type of telephone service, many of which such services are delivered by a telephone response unit (TRU), either interactive, automated, or live agent. Such services typically cost money.

Paying for telephone-based services can be difficult. Typically, a customer must provide a credit card each time he accesses such a system. This is often time consuming. Moreover, some individuals are uncomfortable providing such information over the phone. Further still, the merchant discount rate (interchange) charged to the merchant of the service is significantly higher for a "card not present" transaction over the telephone that if the credit card is present to purchase the service at a point-of-sale (POS). Thus, systems and methods are needed for simplifying the process of accessing telephone-based services.

BRIEF SUMMARY OF THE INVENTION

Embodiments of the invention thus provide a method of providing telephone response unit (TRU)-based services. The method includes receiving from a point-of-sale (POS) device a request at a host computer system to activate TRU-based services. The request includes an identifier that indicates the specific TRU-based services to be activated. The method also includes confirming the availability of the specific TRU-based services to be activated and storing at the host computer system information that indicates the services are activated. The method also includes returning a message to the POS that indicates that the TRU-based services have been activated.

In some embodiments the TRU-based services may include Interactive Voice Response (IVR) services. The TRU-based services may include automated response unit (ARU) services. Returning a message to the POS that indicates that the TRU-based services have been activated may occur in real time with respect to receiving the request from the POS. Real time may be within about 5 seconds. The method may include receiving a request from a TRU to provide an activation status of specific TRU-based services, searching stored information for the activation status of the specific TRU-based services, and returning information that indicates the activation status of the specific TRU-based services. The method may include maintaining a record reflective of an account balance of a customer relating to the specific TRU-based services. The identifier that indicates the specific TRU-based services to be activated may be unique, as to the TRU-based services, to a particular customer. Returning a message to the POS device that indicates that the TRU-based services have been activated may include returning an identifier that is unique to a particular customer. Receiving the request from the POS device to activate TRU-based services may include payment information relating to the TRU-based services. The identifier that indicates the specific TRU-based services to be activated may include a SKU# that relates generally to the TRU-based services to be activated. The TRU-based services may be selected from the group consisting of voice messaging, horoscopes, wagering, general advice, correspondence classes, and books on tape via cell phone.

In some embodiments a method of activating telephone response unit (TRU)-based services includes entering information into a point-of-sale (POS) device. The information includes an identifier of TRU-based services to be activated. The TRU-based services includes prerecorded information. The method also includes transmitting from the POS device a message to a host computer system. The message includes a request to activate the TRU-based services. The method also includes receiving a message from the host computer system that the TRU-based services are active. Receiving a message from the host computer system that the TRU-based services are active may occur in real time with respect to transmitting from the POS device the message to the host computer system. Entering information into the POS may include using a reader associated with POS to read information from a TRU-based services access card. The card may include a selection from the group consisting of a card with a magnetic stripe, a radio frequency identification card, a smart card, a stored value card, a smart chip card, and a bar-coded card.

In still other embodiments, a method of providing telephone response unit (TRU)-based services includes, at a TRU, receiving a request from a customer to access TRU-based services, transmitting from the TRU to a host computer system a request to provide an activation status of TRU-based services relating to the customer, receiving a response from the host computer system, and using the response to determine whether to allow the customer to access the TRU-based services.

In a specific embodiment, a method of providing interactive voice response (IVR) services includes receiving an IVR access number from an IVR access card via a reader associated with a point-of-sale (POS) device and sending the IVR access number to a host computer system for validation. The method also includes, at the host computer system, validating the IVR access number by searching for an activation status of the IVR access number and, in real time, activating the IVR access number by storing information that indicates that the number is active. The method also includes receiving at the host computer system from an IVR system a request to confirm the activation status of the IVR access number and searching for stored information relating to the activation status of the access number. The method also includes returning from the host computer system to the IVR system information that relates to the activation status of the IVR access number and maintaining an account balance relating to the IVR services.

In other embodiments, a system for providing telephone response unit (TRU)-based services includes a point-of-sale (POS) device configured to receive a TRU-based services access number and transmit a request to activate the TRU based services access number to a host computer system. The system also includes the host computer system. The host computer system is programmed to validate the TRU-based services access number by searching for an activation status of the TRU-based services access number and activating the TRU-based services access number by storing information that indicates that the number is active. The host computer system is also programmed to receive from a TRU a request to confirm the activation status of the TRU-based services access number, search for stored information relating to the activation status of the access number, return to the TRU information that relates to the activation status of the TRU-based services access number, and maintain a record reflective of an account balance of the customer.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

According to embodiments of the invention, a customer purchases a telephone-based service access card from a merchant, and the merchant uses a Point-of-Sale (POS) device to activate the card or other presentation instrument, which may be a virtual instrument (e.g., merely an account number). Thereafter, when the customer uses the card to access the service, the system providing the service contacts a host computer to confirm the validity of the card before tendering the service to the customer. In some embodiments, the service is available immediately upon activation or very shortly thereafter.

Often, telephone-based services are delivered using an interactive voice response system (IVR), automated response unit (ARU), or live operator. Herein, "telephone response unit" (or "TRU") will be understood to mean any system that a user accesses electronically that provides commands and options in human voice, thus encompassing all of the aforementioned, and TRU-based services will be used to refer to the service provided therby. TRUs, according to embodiments of the present invention, may be accessed by telephone, computer, personal digital assistant (PDA), two-way pager, interactive television, and the like. The human voice may be pre-recorded human voice, real-time human voice, computer-generated voice, actual human voice, and the like. Examples of TRU services include voice messaging, horoscopes, wagering, general advice, correspondence classes, books on tape via cell phone or other personal computer, and the like. Embodiments of the present invention will be described with respect to a TRU system, although it will be understood that a telephone system is not essential to the present invention. As will be understood by those skilled in the art, other devices may be used to access the services described herein.

Herein, POS device will be understood to mean any device for receiving data at a point-of-sale and using the data in electronic interactions with a host computer system. The POS device may be at a "store front" merchant location where the customer is physically present for the transaction. The POS device also may be at a catalog sales or ecommerce location that the customer contacts via phone, computer, or the like. A POS device may receive information from a telephone-based services card in any of a number of ways. The card may be interfaced to a reader associated with a POS device, which may be a magnetic stripe reader, a proximity reader, an infrared reader, a bar code scanner, or the like. The POS may receive information via a keypad, touch screen, voice reader, or the like. Many other examples are possible. Exemplary POS devices are more fully described in U.S. Pat. No. 6,547,132, the entirety of which is incorporated herein by reference for all purposes.

Figure 1:
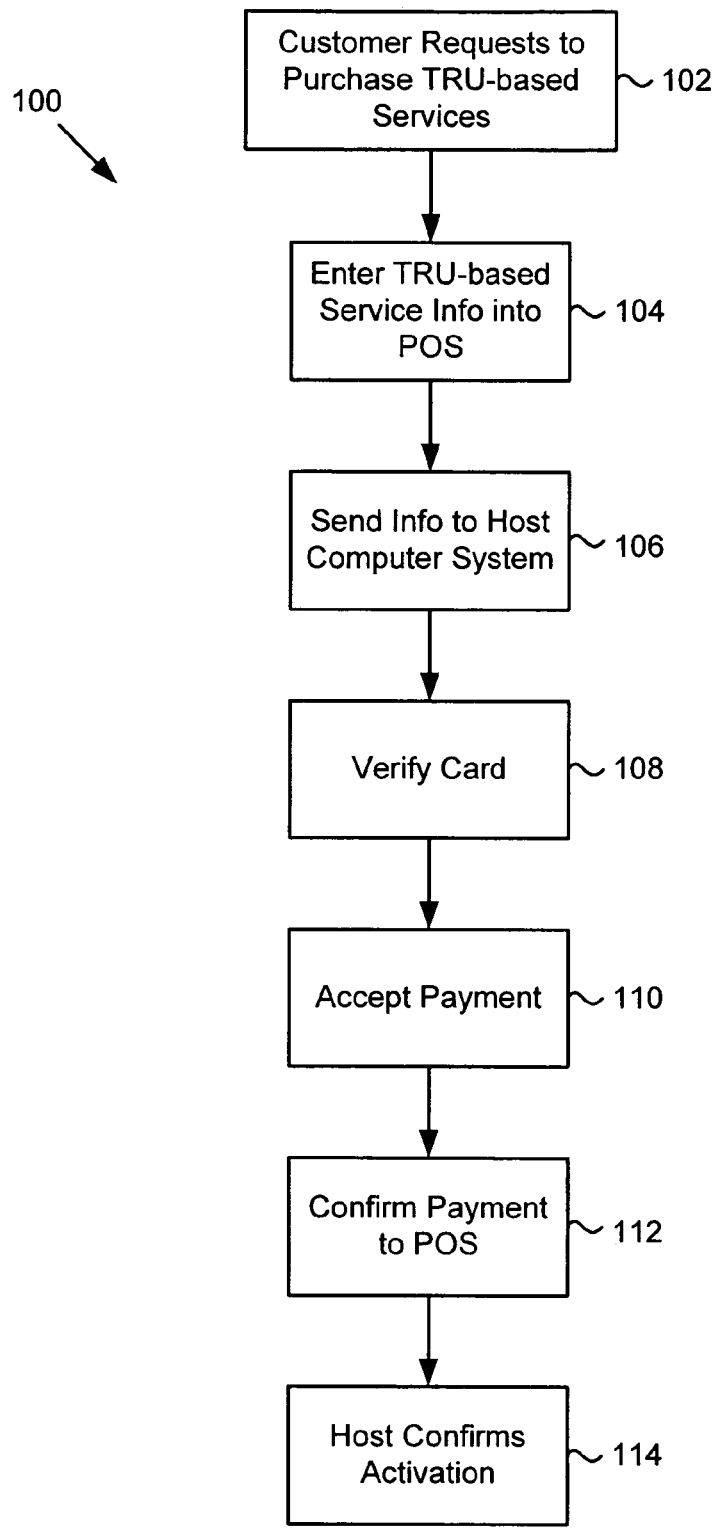
FIG. 1 illustrates a method of activating TRU-based services according to embodiments of the invention.

Attention is directed to FIG. 1, which illustrates a first method 100 of activating a TRU-based services access card according to an embodiment of the invention. At block 102, a customer presents a TRU-based services access card to a merchant for purchase and activation. The card may be any type of instrument that represents the service provided by the TRU. For example, the card may be a stored value card, a radio frequency identification (RFID) card, a smart chip card, a bar-coded card, and the like. The card may be used to access a specific TRU-based service or may be used to access several different TRU-based services.

In one embodiment, the "card" comprises a receipt that the customer receives at the conclusion of the transaction. The receipt has access information that the customer then may use to obtain the TRU-based services. In some embodiments, the customer may be given the access information verbally or electronically, in which case no physical medium is involved. Thus, in some examples, presenting a TRU-based services access card to a merchant for purchase and activation comprises simply requesting such a transaction from the merchant without physically presenting anything to the merchant.

In another embodiment, presenting a TRU-based services card to a merchant for purchase and activation comprises making a selection from an ecommerce merchant (e.g., placing the selection in an electronic shopping card) and "checking out" via any of a number of well known systems for doing such. In yet another example, presenting a TRU-based services card to a merchant for purchase and activation comprises requesting service access via a telephone operator or TRU.

At block 104, the merchant enters transaction information relating to the service requested by the customer into a POS. The transaction information may be a TRU-based services access number, which may be any number that uniquely identifies the service to be provided to this specific customer. The TRU-based services access number may be a unique number on a physical card that the customer presents to the merchant. In other embodiments, the transaction information comprises a product SKU# that represents the service the customer is requesting. This example will be described more fully immediately below.

In this specific example, a customer requests one month of voice mail access from a lobby attendant in a grocery store. The attendant looks in a SKU# book and finds a listing of several TRU-based services available for purchase by customers. In the "TRU Voice Mail" section, the attendant selects "30 days" from a list of levels of access. Other levels may include, for example, 90 days, 12 year, 50 messages, and the like. The attendant then enters the unique SKU# for 30 days of TRU voice mail into the POS. In other examples, the SKU# may represent the service (e.g., voice mail) in which case, the POS may prompt the attendant to enter the level of service by selecting from a menu. Many other variations on this example are possible.

The information may be entered into the POS in any of a number of ways. If the "card" is a physical object, then the card bay be interfaced to the POS in any of a number of ways. The card may be "swiped" through a reader, a bar code on the card may be scanned, the card may be placed in the vicinity of an RFID reader, and the like. In one embodiment, the merchant may use a bar code reader to scan a SKU# in a SKU# book such as in the specific example described in detail above.

In some embodiments, the transaction information entered by the customer also includes payment information. For example, if a customer is purchasing a gift card for accessing a TRU-based services and is paying using a credit card, then the transaction may comprise first swiping the gift card, then swiping the customer's credit card. Those skilled in the art will recognize many variations on this example in light of the teachings herein.

Once the transaction information is entered into the POS, the POS sends the transaction information to a host computer system at block 106. If the transaction information contained a unique TRU-based services access number, then the host confirms the validity of the number. If the transaction information contained only a generic SKU#, then the host computer system may generate a unique access number for the customer. This may include both an access number and a key number (e.g., password) to be used by the customer in combination with the access number to obtain the service.

If the transaction information included a number requiring validation, the host computer returns verification of validity at block 108. At block 110, the merchant accepts payment for the service, then confirms to the POS that the payment was received at block 112. At block 114, the host computer confirms activation of the card and stores data that indicates the card as being active.

As stated previously, block 104, 106, 108, 112, and 114 may be reduced to a two-step process wherein the merchant swipes a card and identifies that the customer has tendered payment (e.g., in cash). Thereafter, the host computer returns confirmation of activation. Many other such examples are possible.

In some embodiments, confirming activation of the card may comprise sending a unique access number and password to the POS. The POS then may be used to print a receipt with the access information. In other embodiments, the POS may print an access card. The access card may be any of the previously mentioned access cards. In some embodiments, the activation process is completed in real time or near real time, thus allowing the customer to instantly access the service. In some embodiments, activation in real time means instantly (e.g., within about 5 seconds), near instantly, and/or with no pre-programmed or intentional delays.

If the customer is acquiring TRU-based services through an ecommerce merchant, catalog mail order operator, TRU, or the like, then the access information may be provided in any of a number of ways. In some examples, the merchant mails a physical card to the customer. In other embodiments, and operator or TRU provides the access information to the customer verbally. In still other embodiments, the access information is displayed on the customer's computer screen. Other examples are possible, and one does not necessarily preempt the other. For example, if the customer orders a card on line (e.g., via the Internet or World Wide Web), the access information may be displayed for the customer while the card is mailed.

Figure 2:
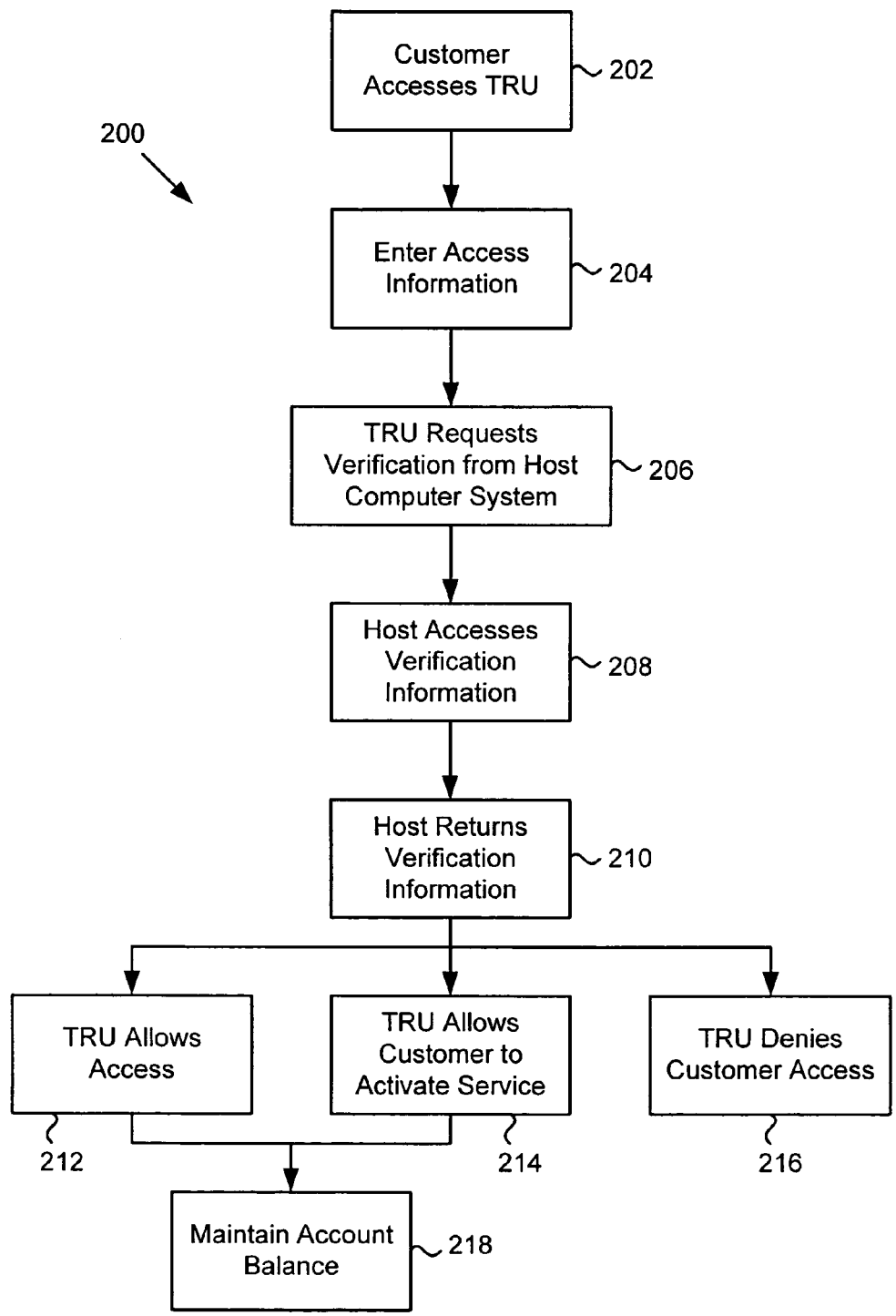
FIG. 2 illustrates a method of providing TRU-based services according to embodiments of the invention.

Having described a method of activating a TRU-based services access card, attention is directed to FIG. 2, which illustrates a method 200 of using a card to access TRU-based services. At block 202, the customer contacts the TRU. The customer may contact the TRU by telephone, computer, PDA, or the like. At block 204, the customer enters his access information. In some embodiments, this comprises entering information via a keypad. In other embodiments, this comprises using a reader (e.g., a magnetic stripe reader) to read information from the card. In other examples, this comprises doing a combination of things such as reading information from the card followed by keying in additional access information, such as via a keypad. Other examples are possible. In some embodiments, the customer may speak the information.

At block 206, the TRU sends verification information to the host computer system. The verification information may comprise the unique identifier given to the customer, the access number on the card, or the like. The verification information also may include the customer's password, if used.

At block 208, the host computer system accesses its stored information to determine if the verification information relates to a valid card. The host computer system responds to the TRU system at block 210. If the card is valid and active, the TRU allows the customer to access the TRU-based services at block 212. If not, the TRU may allow the customer to activate the services at block 214. Otherwise, the TRU may simply deny the customer access at block 216.

Thereafter, the TRU and host computer system may cooperate to keep track of the customer's balance. This may be accomplished in a number of ways. For example, the customer may have purchased a finite number of calls, a finite number of minutes, and/or a finite access period. In either case, the TRU may send information to the host computer system that allows the host computer system to appropriately adjust the customer's balance. The host computer system then may use this information in the future to determine whether the customer should be given access to the service. Keeping track of the customer's declining balance is reflected as block 218 in FIG. 2.

Figure 3:
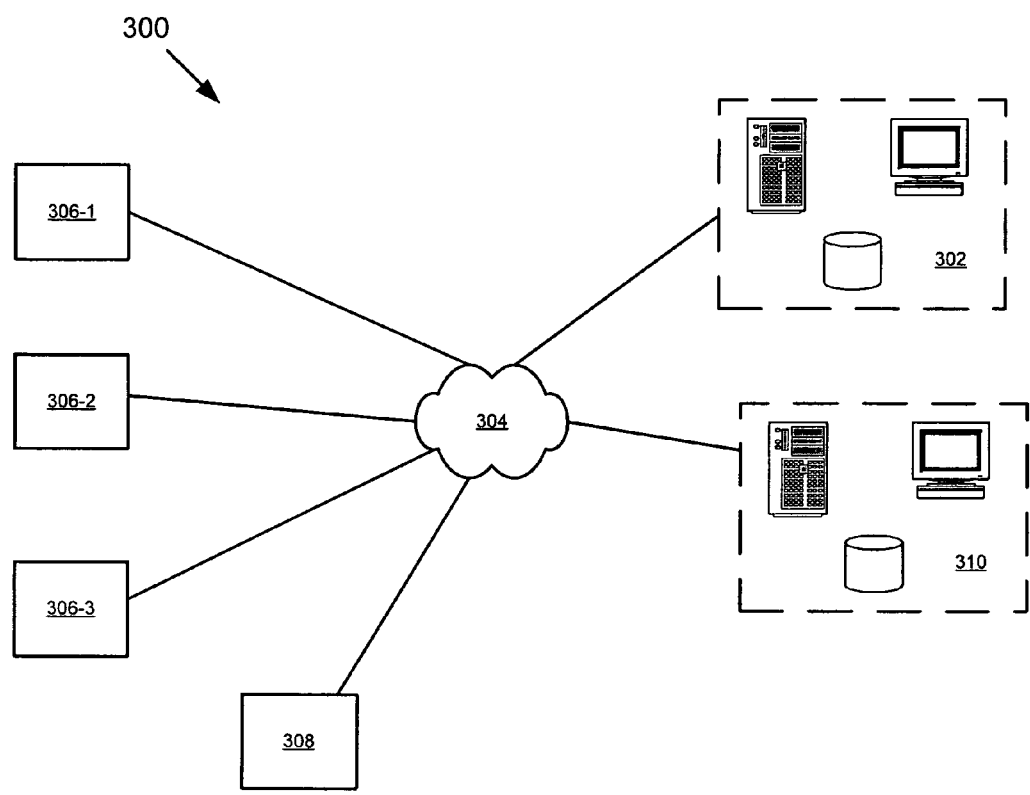
FIG. 3 illustrates a system for providing TRU-based services according to embodiments of the invention.

Having described methods for activating and using TRU-based services access cards, attention is directed to FIG. 3, which illustrates one exemplary embodiment of a system 300 for activating and validating TRU-based services cards. The system 300 includes a host computer system 302 and a network 304. The host computer system 302 may include, for example, server computers, personal computers, workstations, web servers, and/or other suitable computing devices. The host computer system 302 includes application software that programs the host computer system 302 to perform one or more functions according to the present invention. For example, application software resident on the host computer system 302 may program the host computer system 302 to activate TRU-based services access cards and thereafter confirm the validity of such cards to an TRU. The host computer system 302 may include one or more of the aforementioned computing devices, as well as storage devices such as databases, disk drives, optical drives, and the like. The storage devices may include solid state memory, such as RAM, ROM, PROM, and the like, magnetic memory, such as disc drives, tape storage, and the like, and/or optical memory, such as DVD. The host computer system 302 may be fully located within a single facility or distributed geographically, in which case an internal network may be used to integrate the host computer system 302. Many other examples are possible and apparent to those skilled in the art in light of this disclosure.

The network 304 may be the Internet, an intranet, a wide area network (WAN), a local area network (LAN), a virtual private network, any combination of the foregoing, or the like. The network 304 may include both wired and wireless connections, including optical links. In some embodiments, the network 304 comprises a transaction processing network. The network may comprise partitions of the Public Switched Telephone Network (PSTN). Through the network 304, POS devices communicate with the host computer system 302, the host computer system communicates with the TRU, and customers communicate with the TRU. In other embodiments, different networks may be used for each of the foregoing.

The system 300 also includes one or more Point-of-Sale (POS) devices 306. POS devices are more fully described in previously-incorporated U.S. Pat. No. 6,547,132. Essentially, POS devices are terminals for receiving information and sending the information to a host computer system. For example, a POS may receive TRU-based services access card activation information by capturing it from a card using a reader integral to or associated with the POS. A POS also may receive information from an attendant or customer via a keypad, keyboard, and/or other input device. Other examples are possible. POS devices typically are located at retail locations, but may be located in other locations that potential customers may frequent. In some embodiments, a POS 306-1 is located at a Brick & Mortar store front location, a POS 306-2 is located at a telephone sales location, and a POS 306-3 is located at an ecommerce location.

The system 300 also includes a TRU 308. TRUs are known in the art. For example, U.S. Pat. No. 5,179,585, which patent is entirely incorporated herein for all purposes, describes TRUs in greater detail. The TRU 308 may provide any of a variety of services to customers, including voice messaging, horoscopes, wagering, general advice, correspondence classes, books on tape via cell phone or other personal computer, and the like.

Like the host computer system 302, the TRU 308 may include server computers, personal computers, workstations, web servers, and/or other suitable computing devices. The TRU 308 may include application software that programs it to perform one or more functions according to the present invention. For example, application software resident on the TRU 308 may program it to provide TRU-based services according to embodiments of the present invention. The TRU 308 may include one or more of the aforementioned computing devices, as well as storage devices such as databases, disk drives, optical drives, and the like. The storage devices may include solid state memory, such as RAM, ROM, PROM, and the like, magnetic memory, such as disc drives, tape storage, and the like, and/or optical memory, such as DVD. The TRU 308 may be fully located within a single facility or distributed geographically, in which case an internal network may be used to integrate it. Many other examples are possible and apparent to those skilled in the art in light of this disclosure.

The system 300 also may include one or more TRU-based services access devices 310 through which customers may access the TRU. TRU-based services access devices include telephones, cell phones, PDAs, personal computers, and the like. Customers also may use the TRU-based services access devices to contact attendants at ecommerce business locations, telephone sales locations, and the like.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A method of providing telephone response unit (TRU)-based services, comprising:
   receiving from a point-of-sale (POS) device a request at a host computer system to activate TRU-based services, wherein the request comprises an identifier that indicates the specific TRU-based services to be activated;
   confirming the availability of the specific TRU-based services to be activated;
   storing at the host computer system information that indicates the services are activated;
   returning a message to the POS that indicates that the TRU-based services have been activated, wherein returning a message to the POS device that indicates that the TRU-based services have been activated comprises returning an identifier that is unique to a particular customer;
   receiving a request at the host computer system from a TRU relating to the specific TRU-based services to provide an activation status of the specific TRU-based services;
   searching stored information at the host computer system for the activation status of the specific TRU-based services;
   returning information that indicates the activation status of the specific TRU-based services; and
   maintaining a record at the host computer system reflective of an account balance of a customer relating to the specific TRU-based services.

2. The method of claim 1, wherein the TRU-based services comprise Interactive Voice Response (IVR) services.

3. The method of claim 1, wherein the TRU-based services comprise automated response unit (ARU) services.

4. The method of claim 1, wherein returning a message to the POS that indicates that the TRU-based services have been activated occurs in real time with respect to receiving the request from the POS.

5. The method of claim 4, wherein real time comprises within about 5 seconds.

6. The method of claim 1, wherein the identifier that indicates the specific TRU-based services to be activated is unique, as to the TRU-based services, to a particular customer.

7. The method of claim 1, wherein receiving the request from the POS device to activate TRU-based services further comprises payment information relating to the TRU-based services.

8. The method of claim 1, wherein the identifier that indicates the specific TRU-based services to be activated comprises a SKU#that relates generally to the TRU-based services to be activated.

9. The method of claim 1, wherein the TRU-based services are selected from the group consisting of voice messaging, horoscopes, wagering, general advice, correspondence classes, and books on tape via cell phone.

10. A method of activating telephone response unit (TRU)-based services, comprising:
    entering information into a point-of-sale (POS) device, wherein the information comprises an identifier of TRU-based services to be activated, and wherein the TRU-based services comprise prerecorded information;

transmitting from the POS device a message to a host computer system, wherein the message comprises a request to activate the TRU-based services;

receiving a message from the host computer system that the TRU-based services are active, wherein receiving a message from the host computer system that the TRU-based services are active comprises returning an identifier for accessing the TRU-based services that is unique to a particular customer; and maintaining a record at the host computer system reflective of an account balance of a customer relating to the TRU-based services.

11. The method of claim 10, wherein receiving a message from the host computer system that the TRU-based services are active occurs in real time with respect to transmitting from the POS device the message to the host computer system.

12. The method of claim 10, wherein entering information into the POS comprises using a reader associated with the POS to read information from a TRU-based services access card.

13. The method of claim 12, wherein the card comprises a selection from the group consisting of a card with a magnetic stripe, a radio frequency identification card, a smart card, a stored value card, a smart chip card, and a bar-coded card.

* * * * *